US012110989B2

(12) United States Patent
Kuo

(10) Patent No.: US 12,110,989 B2
(45) Date of Patent: Oct. 8, 2024

(54) METHOD AND APPARATUS FOR VALVE CORE INSTALLATION/REMOVAL

(71) Applicant: Fieldpiece Instruments, Inc., Orange, CA (US)

(72) Inventor: Henry J Kuo, Orange, CA (US)

(73) Assignee: Fieldpiece Instruments, Inc., Orange, CA (US)

( * ) Notice: Subject to any disclaimer, the term of this patent is extended or adjusted under 35 U.S.C. 154(b) by 0 days.

(21) Appl. No.: 18/507,977

(22) Filed: Nov. 13, 2023

(65) Prior Publication Data

US 2024/0229970 A1 Jul. 11, 2024

Related U.S. Application Data

(63) Continuation of application No. 18/093,712, filed on Jan. 5, 2023, now Pat. No. 11,879,565.

(51) Int. Cl.
*F16K 43/00* (2006.01)

(52) U.S. Cl.
CPC ...... *F16K 43/003* (2013.01); *F25B 2345/006* (2013.01)

(58) Field of Classification Search
None
See application file for complete search history.

(56) References Cited

U.S. PATENT DOCUMENTS

| | | | | |
|---|---|---|---|---|
| 4,706,357 A * | 11/1987 | Ewing | ........... | B25B 27/24 |
| | | | | 29/213.1 |
| 6,253,436 B1 * | 7/2001 | Barjesteh | ........... | B25B 27/24 |
| | | | | 29/213.1 |
| 8,899,254 B1 * | 12/2014 | Weiler | ........... | F16L 41/06 |
| | | | | 81/53.2 |
| 10,478,953 B2 * | 11/2019 | Green | ........... | B25B 27/24 |
| 11,549,612 B1 * | 1/2023 | Jones | ........... | F16K 27/067 |
| 11,879,565 B1 * | 1/2024 | Kuo | ........... | F16K 43/003 |
| 2020/0269400 A1 * | 8/2020 | Jones | ........... | B25B 13/48 |

* cited by examiner

*Primary Examiner* — Kevin R Barss
(74) *Attorney, Agent, or Firm* — Paul J. Backofen, Esq.

(57) ABSTRACT

A dual-valve, valve core installation/removal tee enable the removal and or replacement of a Schrader® valve insert without evacuating the refrigeration system. The use of a dual-valve valve core installation/removal tee also permits the valve core to be removed and maintenance of the HVAC system to be performed without the flow restriction of the valve core and core depressor.

9 Claims, 5 Drawing Sheets

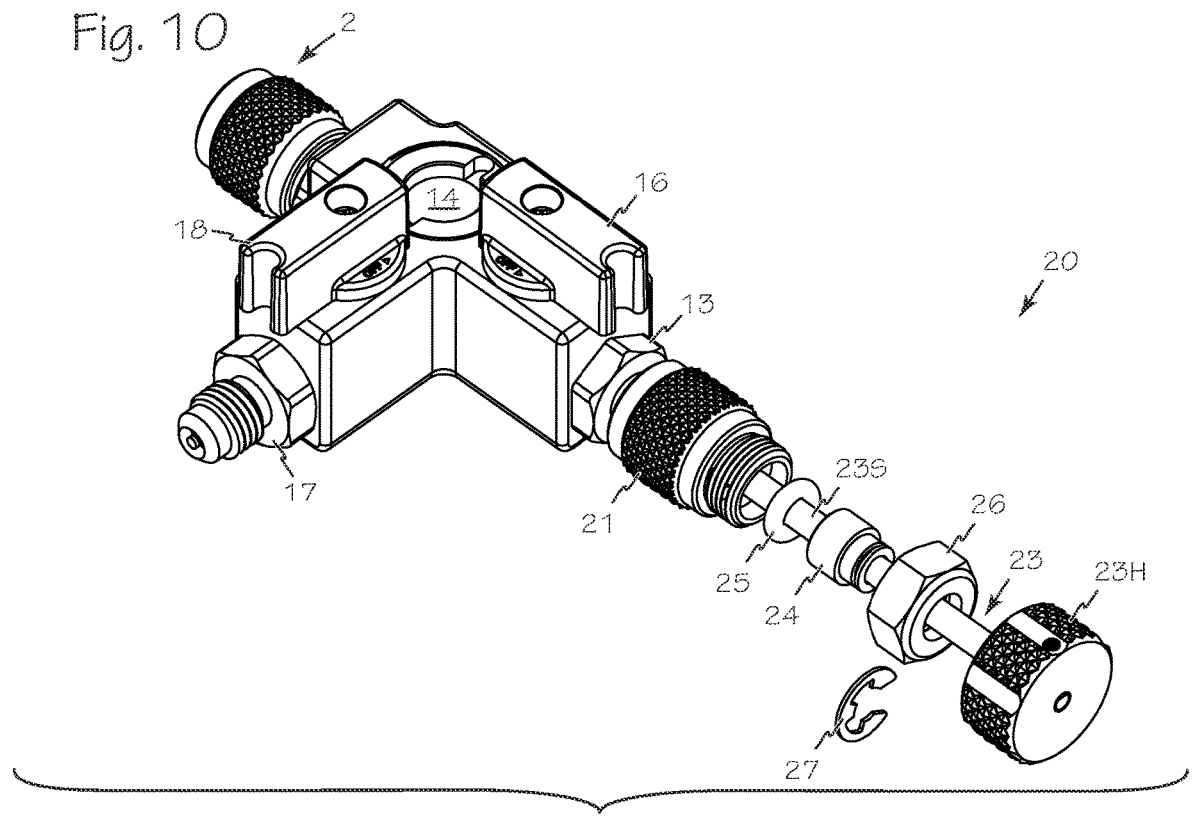
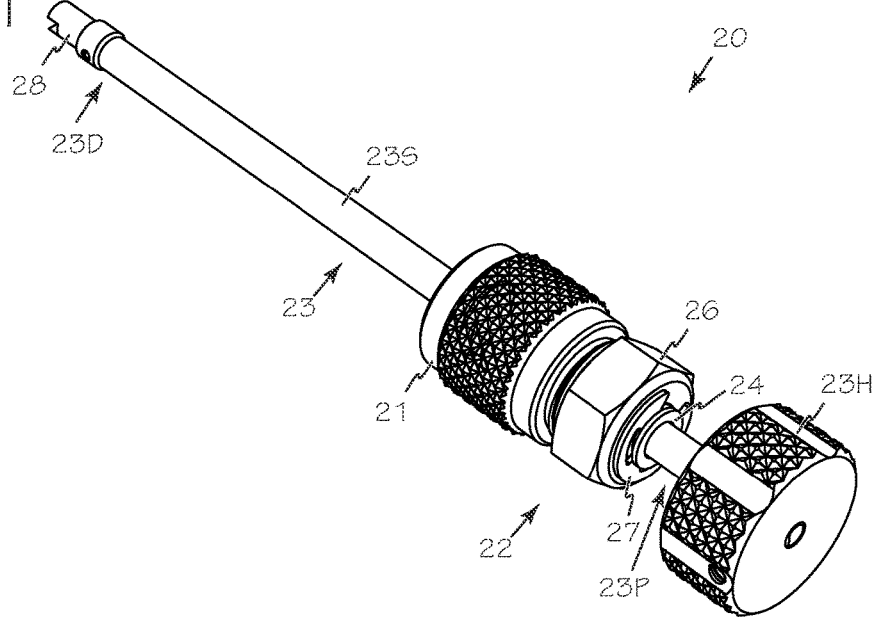

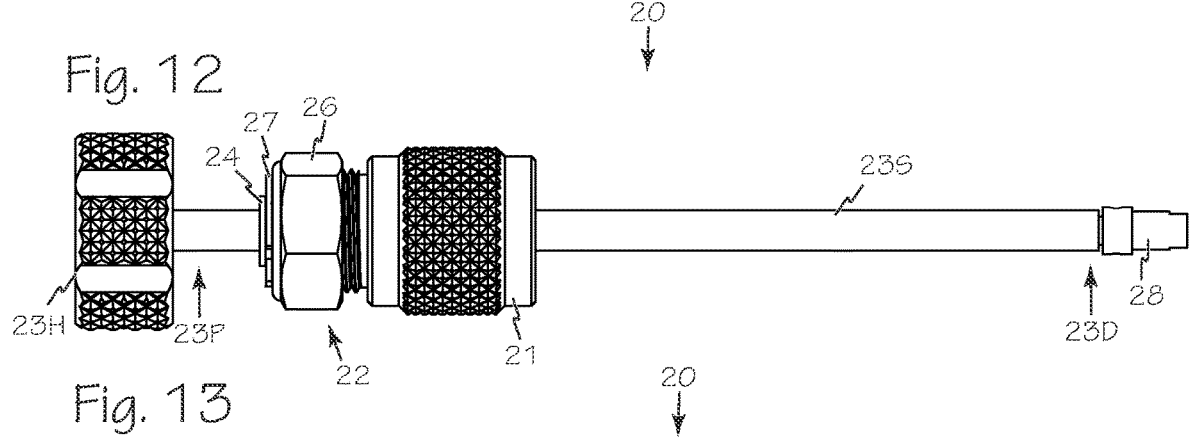
Fig. 12
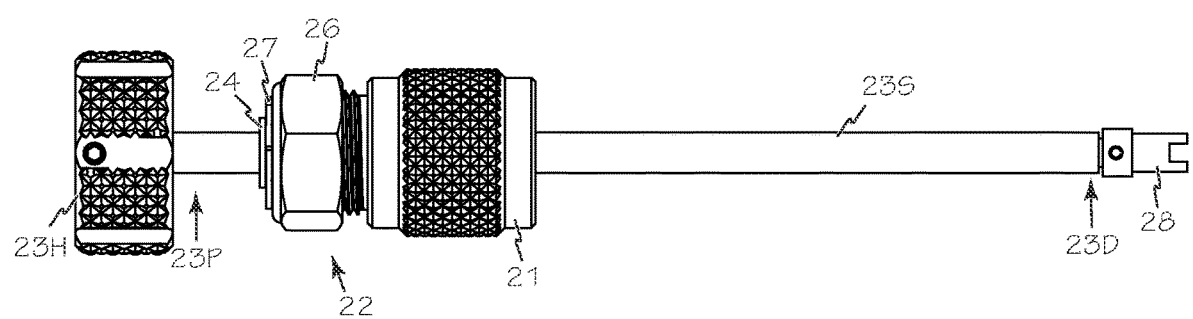
Fig. 13
Fig. 14
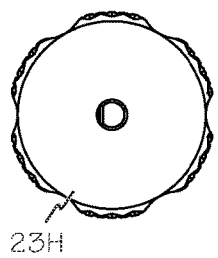
Fig. 15
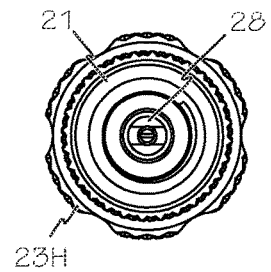

METHOD AND APPARATUS FOR VALVE CORE INSTALLATION/REMOVAL

This application is a continuation of U.S. application Ser. No. 18/093,712 filed Jan. 5, 2023.

FIELD OF THE INVENTIONS

The inventions described below relate to the field of heating, ventilation and air conditioning equipment.

BACKGROUND OF THE INVENTIONS

Conventional heating, ventilation, air conditioning and refrigeration (HVACR) Schrader® valves are a connector to allow refrigerant to be introduced into an HVACR system or removed from an HVACR system. (Schrader® is a registered trademark of Sensata Technologies, Inc.) The Schrader® valve core is centrally located in the valve and spring-biased to a closed position preventing refrigerant from escaping. When a mating connector is attached, a centrally located "core depressor" pushes the top pin of the core, compresses the biasing spring and causes the valve to open, allowing refrigerant flow.

Some conventional core depressors are hollow to allow refrigerant flow, and others have a flat blade that threads into the inside surface of a gasket. The Schrader® valve and the core depressor are a limitation to the flow of refrigerant. Additionally, Schrader® valves need to be replaced periodically to maintain system integrity.

SUMMARY

The devices and methods described below provide for a method and a dual-valve, valve core installation/removal tee for removal and or replacement of a Schrader® valve insert without evacuating the refrigeration system. The use of a dual-valve, valve core installation/removal tee also permits the valve core to be removed and maintenance of the HVAC system to be performed without the flow restriction of the valve core and core depressor.

BRIEF DESCRIPTION OF THE DRAWINGS

FIG. 10 is an exploded perspective view of the dual-valve, valve core removal tee of FIG. 2 with the components of the valve core removal arm exposed.

FIG. 11 is a top-right perspective view of a valve core removal arm.

FIG. 12 is a side view of the valve core removal arm of FIG. 11.

FIG. 13 is a top view of the valve core removal arm of FIG. 11.

FIG. 14 is a front end view of the valve core removal arm of FIG. 11.

FIG. 15 is a rear end view of the valve core removal arm of FIG. 11.

DETAILED DESCRIPTION OF THE INVENTIONS

Figure 1A:
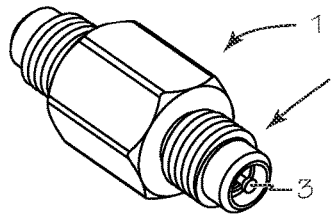
FIG. 1A is a perspective view of a prior art flare fitting with a Schrader® valve.
Figure 1B:
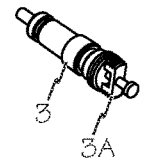
FIG. 1B is a perspective view of a prior art Schrader® valve core.
Figure 2:
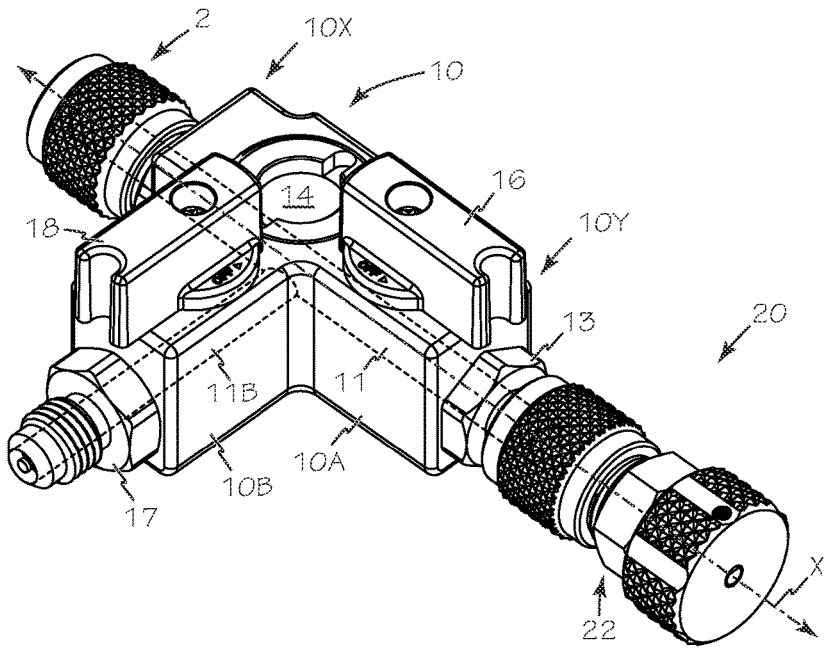
FIG. 2 is a perspective view of the dual-valve, valve core removal tee.

FIG. 1A illustrates a prior-art flare fitting 1 equipped with a Schrader® valve 2. FIG. 1B illustrates the prior-art Schrader® valve core 3 of FIG. 1A exposing the valve core shoulders 3A which enable removal of the valve core from the Schrader® valve.

Figure 3:
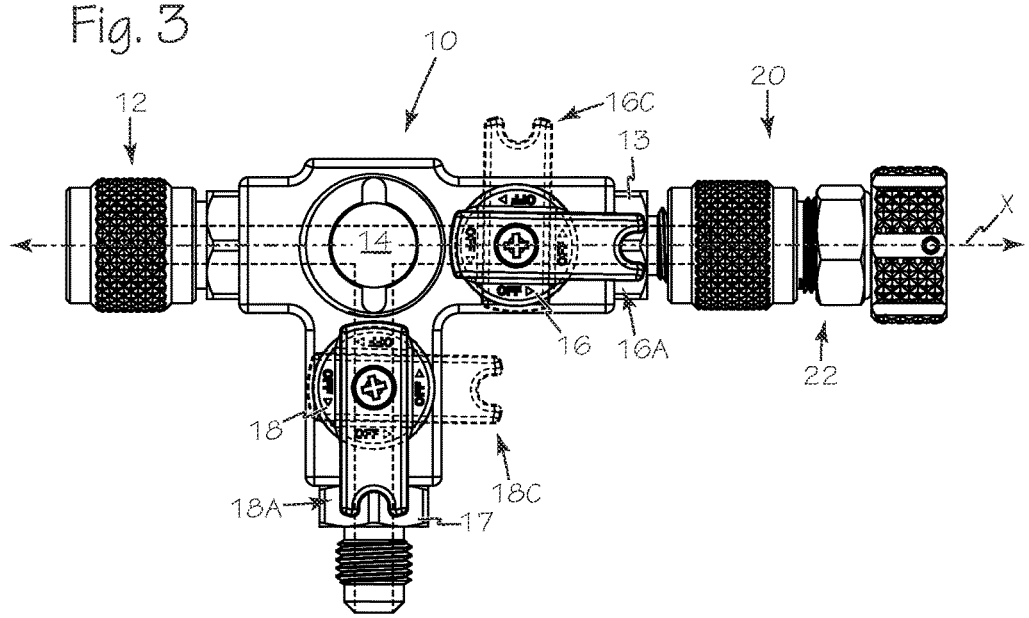
FIG. 3 is a top plan view of the dual-valve, valve core removal tee of FIG. 2.
Figure 4:
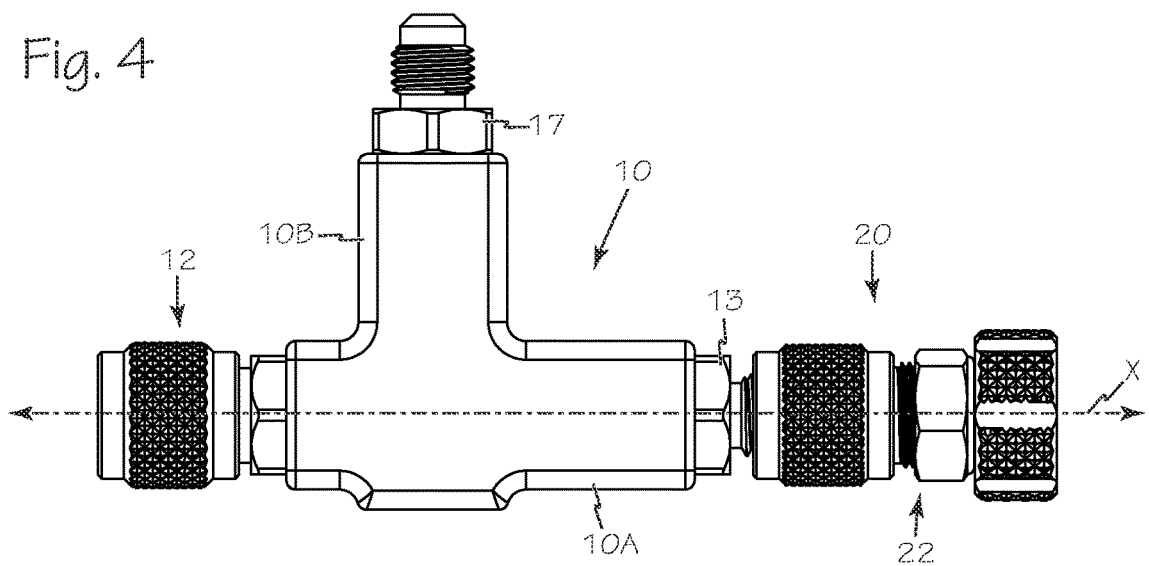
FIG. 4 is a bottom view of the dual-valve, valve core removal tee of FIG. 2.
Figure 5:
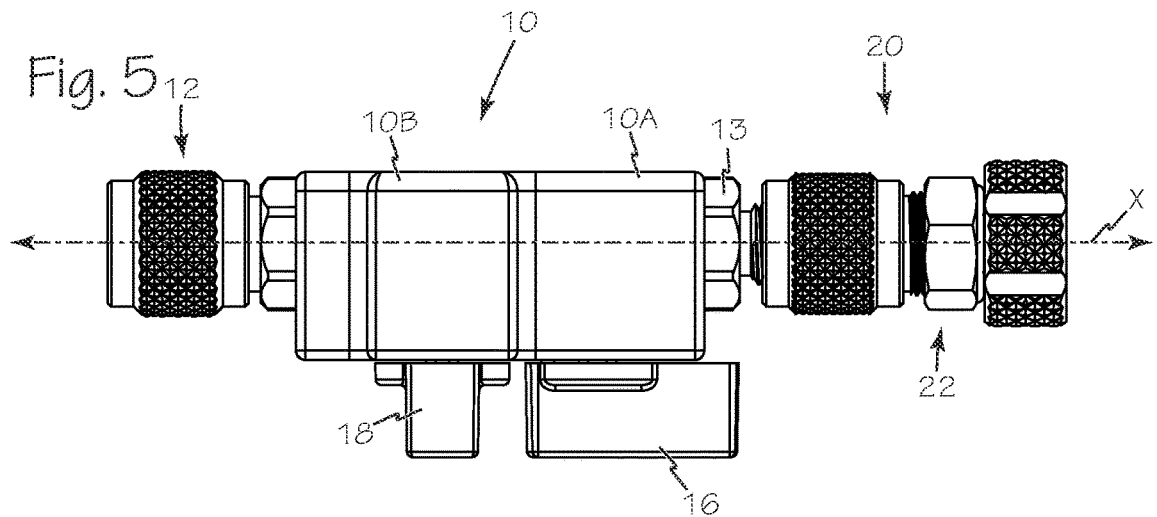
FIG. 5 is a right side view of the dual-valve, valve core removal tee of FIG. 2.
Figure 6:
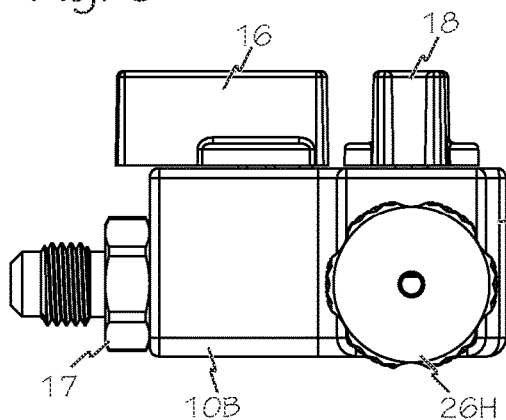
FIG. 6 is a front end view of the dual-valve, valve core removal tee of FIG. 2.
Figure 7:
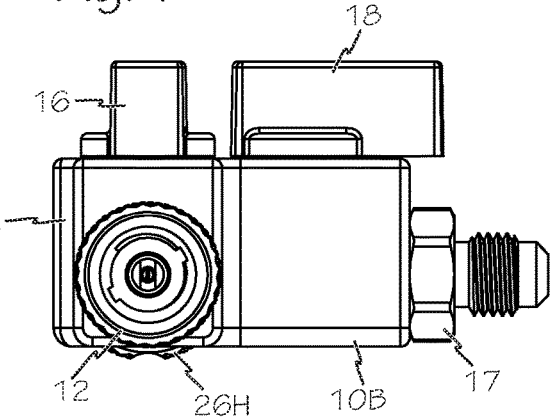
FIG. 7 is a back end view of the dual-valve, valve core removal tee of FIG. 2.
Figure 8:
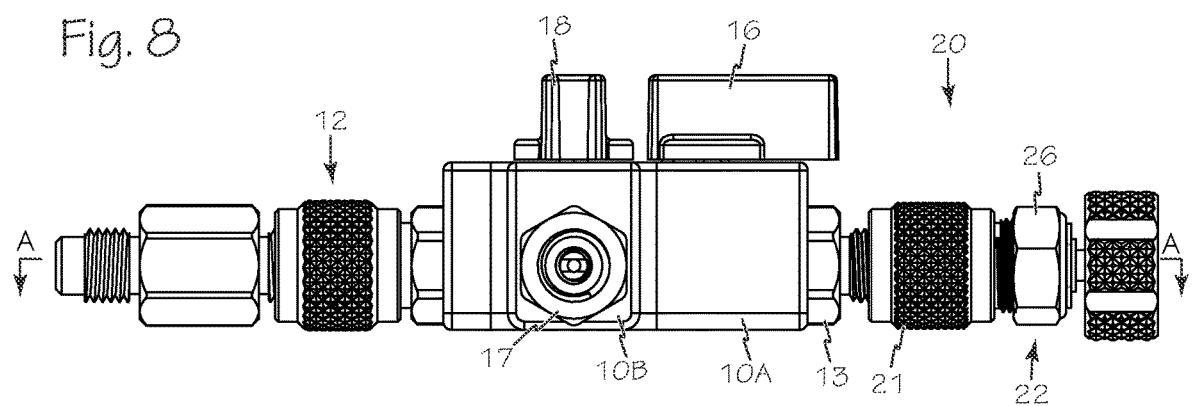
FIG. 8 is a is a left side view of the dual-valve, valve core removal tee of FIG. 2 engaging the flare fitting of FIG. 1.

The dual-valve, valve core installation/removal tee 10 is illustrated in FIGS. 2 through 10. Dual-valve, valve core installation/removal tee 10 has a generally linear main body 10A with a longitudinal axis X colinear the main bore 11. Primary body 10A includes primary port 12 at a first end 10X of the main body and a secondary port 13 at the second end 10Y of the main body. A sight glass 14 between the primary port 12 and the secondary port 13 enables visibility into main bore 11. Primary valve 16 is oriented between the sight glass 14 and the secondary port 13 and is used to isolate secondary port 13 which is the valve core removal port from the primary port 12. In FIG. 3 primary valve 16 is illustrated in open position 16A and a dashed line illustration of the primary valve is shown in closed position 16C. A drain/fill or utility arm 10B attaches to primary body 10A perpendicular to the longitudinal axis X between the primary port 12 and the primary valve 16. Drain/fill arm 10B includes drain/fill port 17, secondary valve 18 and access bore 11B which puts drain/fill port 17 in fluid communication with primary bore 11. Secondary valve 18 enables closure of access bore 11B between drain/fill port 17 and primary bore 11. In FIG. 3 secondary valve 18 is illustrated in open position 18A and a dashed line illustration of the secondary valve is shown in closed position 18C.

Secondary or valve core removal port 13 is sized to accommodate the valve core installation/removal assembly 20. Valve core installation/removal assembly 20 is illustrate in FIGS. 10 through 15. Sight glass 14 permits a visual check of the removal and reinstallation of a valve core such as valve core 3 engaged on the distal end of the valve core removal assembly. Primary port 12 is sized to connect to the flare fitting 1 which is part of any suitable HVAC system. Primary valve 16 and secondary valve 18 are preferably ball valves, however, any suitable valve may be used.

Referring now to FIG. 10 through 15, valve core installation/removal assembly 19 includes attachment collar 21, with a friction control assembly 22, and valve core installation/removal assembly 23. Friction control assembly 22 engages attachment collar 21 and provides friction control of the valve core installation/removal assembly 23 when the primary valve is opened and the bore is pressurized.

Figure 9:
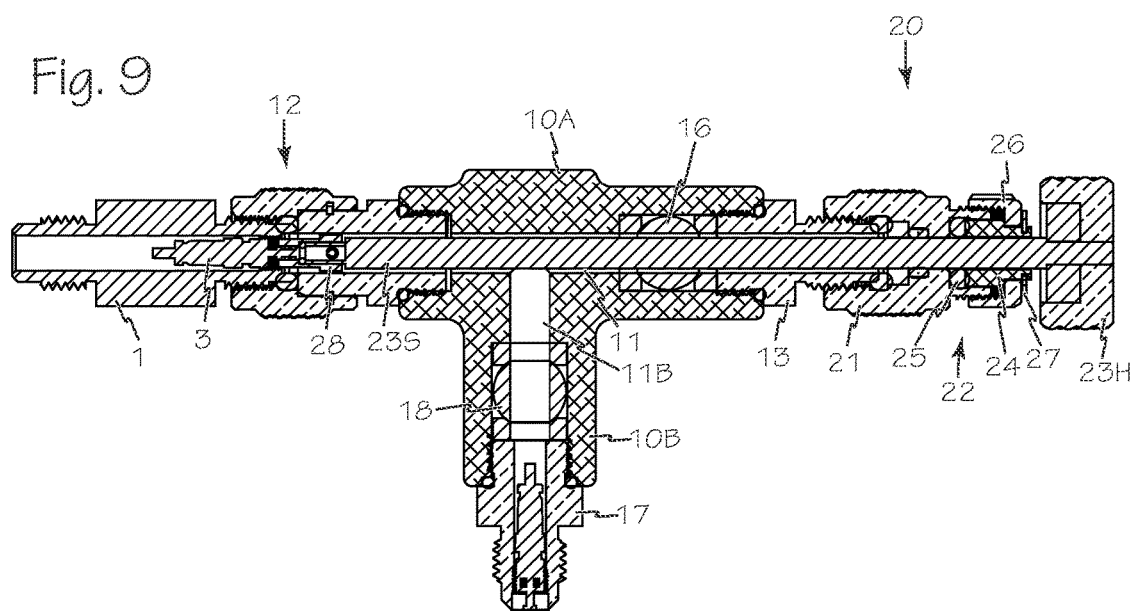
FIG. 9 is a cross-section view of the dual-valve, valve core removal tee and flare fitting of FIG. 8 taken along A-A.

Friction control assembly 22 includes friction control sleeve 24, O-ring 25, friction control cap 26 and lock ring 27. The friction control sleeve 24 is secured to the friction control cap 26 using lock ring 27 as illustrated in FIGS. 9 and 11. As illustrated in FIGS. 11, 12 and 13, the valve core installation/removal assembly 23 includes shaft 23S secured to magnetic handle 23H at the proximal end 23P of the shaft and valve core engagement tool 28 secured on the distal end 23D of the shaft 23S. Magnetic handle 23H enables the valve core installation/removal shaft to be magnetically secured to the housing of an HVAC system, or any other suitable ferrous surface, to keep the valve core installation/removal shaft and an engaged valve core clean and off the ground and or any surrounding surfaces during HVAC maintenance.

In use, to remove a Schrader® valve core from an HVAC flare fitting such as flare fitting 1 using a dual-valve, valve core installation/removal tee 10 the primary valve 16 is opened, open position 16A, and the secondary valve 18 is closed, closed position 18C, and the primary port of the dual-valve, valve core installation/removal tee 10 is secured to flare fitting 1.

The friction control cap 26 is adjusted to maintain sufficient friction on the valve core installation/removal shaft 23S to prevent the shaft from extending dangerously fast when Schrader® valve core 3 is removed from flare fitting 1 and the pressure of the refrigerant is released into dual-valve, valve core installation/removal tee 10. With the friction control cap adjusted, the valve core installation/removal shaft handle 23H is pushed into the dual-valve, valve core installation/removal tee 10 with slight rotation until the valve core engagement tool 28 engages shoulders 3A of the valve core. With the valve core engagement tool 28 engaging the valve core 3, the valve core installation/removal shaft handle 23H is rotated to disengage the valve core 3 from the flare fitting 1. When the valve core is disengaged from the flare fitting 1 the pressure of the refrigerant will apply pressure to the valve core installation/removal shaft 23S and the shaft will begin to extend out or away from the flare fitting. The valve core installation/removal shaft 23S should be held with the valve core engagement tool 28 visible in the sight glass 14 to confirm that the Schrader® valve core is engaged to the valve core engagement tool 28. With confirmation that the valve core is secured to the valve core engagement tool, the valve core installation/removal shaft 23S should be extended as far as possible away from the dual-valve, valve core installation/removal tee 10.

With the valve core installation/removal shaft 23S in the fully extended position, the primary valve 16 is rotated into closed position 16C. The attachment collar 21 is removed from the secondary port 13 and the valve core installation/removal assembly 20 with the attached valve core 3 is removed from the dual-valve, valve core installation/removal tee 10 and the magnetic handle 23H of the valve core installation/removal shaft may be removably secured to any metal surface in the vicinity of the flare fitting to keep the valve core clean during the system maintenance.

The HVAC system may them be maintained through the secondary port 13 and or the drain/fill port 17 with the assistance of the primary valve 16 and the secondary valve 18.

The previous process may be performed in reverse order to insert and new Schrader® valve core or to reinstall the previously removed valve core.

While the preferred embodiments of the devices and methods have been described in reference to the environment in which they were developed, they are merely illustrative of the principles of the inventions. The elements of the various embodiments may be incorporated into each of the other species to obtain the benefits of those elements in combination with such other species, and the various beneficial features may be employed in embodiments alone or in combination with each other. Other embodiments and configurations may be devised without departing from the spirit of the inventions and the scope of the appended claims.

I claim:

1. A method of removing a valve core from a flare fitting in a Heating, Ventilation and Air Conditioning (HVAC) system comprising the steps:
   providing a dual-valve, valve core installation/removal tee with a primary valve, a primary port, a secondary port, a utility port, a friction control assembly with a friction control cap and a valve core installation/removal assembly with a handle and a valve core engagement tool, the valve core installation/removal assembly secured to the secondary port using an attachment collar;
   opening the primary valve;
   securing primary port of the dual-valve, valve core installation/removal tee to the flare fitting;
   adjusting the friction control cap to maintain sufficient friction on the valve core installation/removal assembly;
   pushing the valve core installation/removal shaft handle into the dual-valve, valve core installation/removal tee with slight rotation until the valve core engagement tool engages the valve core;
   rotating the valve core installation/removal assembly handle to disengage the valve core from the flare fitting;
   extending the valve core installation/removal handle fully;
   rotating the primary valve into a closed position;
   loosening the attachment collar; and
   removing the valve core installation/removal assembly and the engaged valve core from the secondary port.

2. The method of claim 1 wherein the dual-valve, valve core installation/removal tee further comprises a sight glass between the primary port and the primary valve wherein the method between the steps of rotating the valve core installation/removal assembly handle to disengage the valve core from the flare fitting and the step of extending the valve core installation/removal handle fully, further comprises the step:
   holding the valve core installation/removal assembly handle with the valve core engagement tool visible in the sight glass to confirm that the valve core is engaged to the valve core engagement tool.

3. The method of claim 2 wherein the handle of the valve core installation/removal assembly is magnetic and the method further comprises the last step:
   magnetically engaging the handle of the valve core installation/removal assembly with the engaged valve core to any suitable surface near the flare fitting.

4. A method of servicing an HVAC system through a flare fitting with a valve core comprising the steps:
   removing the valve core according to claim 2;
   servicing the HVAC system through the utility port.

5. A method of claim 4 wherein the servicing step is performed through the secondary port.

6. The method of claim 1 wherein the handle of the valve core installation/removal assembly is magnetic and the method further comprises the last step:
   magnetically engaging the handle of the valve core installation/removal assembly with the engaged valve core to any suitable surface near the flare fitting.

7. A method of servicing an HVAC system through a flare fitting with a valve core comprising the steps:
   removing the valve core according to claim 1;
   servicing the HVAC system through the utility port.

8. A method of claim 7 wherein the servicing step is performed through the secondary port.

9. A method of servicing an HVAC system via a flare fitting with a Schrader® valve core comprising the steps:
- providing a dual-valve, valve core installation/removal tee with a primary valve, a primary port, a sight glass between the primary valve and the primary port, a secondary port, a secondary valve, a utility port, a friction control assembly with a friction control cap and a valve core installation/removal assembly with a magnetic handle and a valve core engagement tool, the valve core installation/removal assembly secured to the secondary port using an attachment collar;
- opening the primary valve;
- closing the secondary valve;
- securing primary port of the dual-valve, valve core installation/removal tee to the flare fitting;
- adjusting the friction control cap to maintain sufficient friction on the valve core installation/removal assembly;
- pushing the valve core installation/removal shaft handle into the dual-valve, valve core installation/removal tee with slight rotation until the valve core engagement tool engages the Schrader® valve core;
- rotating the Schrader® valve core installation/removal assembly handle to disengage the valve core from the flare fitting;
- holding the valve core installation/removal assembly handle with the valve core engagement tool visible in the sight glass to confirm that the Schrader® valve core is engaged to the valve core engagement tool;
- extending the valve core installation/removal handle fully;
- rotating the primary valve into a closed position;
- loosening the attachment collar;
- removing the valve core installation/removal assembly and the engaged Schrader® valve core from the secondary port;
- magnetically engaging the handle of the valve core installation/removal assembly with the engaged Schrader® valve core to any suitable surface near the flare fitting; and
- servicing the HVA system through the secondary port or the utility port.

* * * * *